United States Patent
Lucia

(10) Patent No.: US 11,898,671 B2
(45) Date of Patent: Feb. 13, 2024

(54) AIR HOSE COUPLER HOUSING

(71) Applicant: Robert Joseph Lucia, Port Charlotte, FL (US)

(72) Inventor: Robert Joseph Lucia, Port Charlotte, FL (US)

(\*) Notice: Subject to any disclaimer, the term of this patent is extended or adjusted under 35 U.S.C. 154(b) by 0 days.

(21) Appl. No.: 17/545,111

(22) Filed: Dec. 8, 2021

(65) Prior Publication Data

US 2022/0205567 A1 Jun. 30, 2022

Related U.S. Application Data

(60) Provisional application No. 63/130,860, filed on Dec. 28, 2020.

(51) Int. Cl.
| | |
|---|---|
| *F16L 25/14* | (2006.01) |
| *F16L 33/24* | (2006.01) |
| *F16L 41/08* | (2006.01) |
| *F16L 9/02* | (2006.01) |
| *F16L 47/26* | (2006.01) |
| *F16L 19/02* | (2006.01) |

(52) U.S. Cl.
CPC ............... *F16L 25/14* (2013.01); *F16L 33/24* (2013.01); *F16L 41/08* (2013.01); *F16L 19/02* (2013.01); *F16L 47/26* (2013.01); *Y10T 29/49826* (2015.01)

(58) Field of Classification Search
CPC ... F16L 5/00; F16L 41/08; F16L 47/26; F16L 47/28; F16L 47/34; F16L 41/10; F16L 41/14

USPC .......................................... 285/192, 219, 212
See application file for complete search history.

(56) References Cited

U.S. PATENT DOCUMENTS

| | | | | |
|---|---|---|---|---|
| 1,885,042 | A * | 10/1932 | Baldwin, Jr. | 285/192 |
| 2,793,830 | A * | 5/1957 | Nakaji | 285/364 |
| 3,453,005 | A * | 7/1969 | Foults | |
| 5,230,536 | A * | 7/1993 | Rider | 285/192 |
| 7,909,366 | B1 * | 3/2011 | Hall | 285/219 |
| 2020/0116279 | A1 * | 4/2020 | Galbreath | F16L 41/10 |

FOREIGN PATENT DOCUMENTS

CN 109405240 A * 3/2019

\* cited by examiner

*Primary Examiner* — William S. Choi
(74) *Attorney, Agent, or Firm* — Lori Sandman, Esq.

(57) ABSTRACT

A hose coupler housing assembly for air and fluid hoses having an externally threaded cylindrical outer component (2) for mounting recessed on a planar surface encompassing a female quick connect coupler (1). The housing allows a user to insert or remove a male hose fitting into the coupler by depressing and releasing an inner component (3). A rotating dust cover (4) mounts to the top of the inner component with a screw (6) through a countersunk aperture (16) and protects the female quick connect coupler when not in use. The outer component is held to the planar surface with an internally threaded retaining ring (5) which mates to the externally threaded body of the outer component.

11 Claims, 4 Drawing Sheets

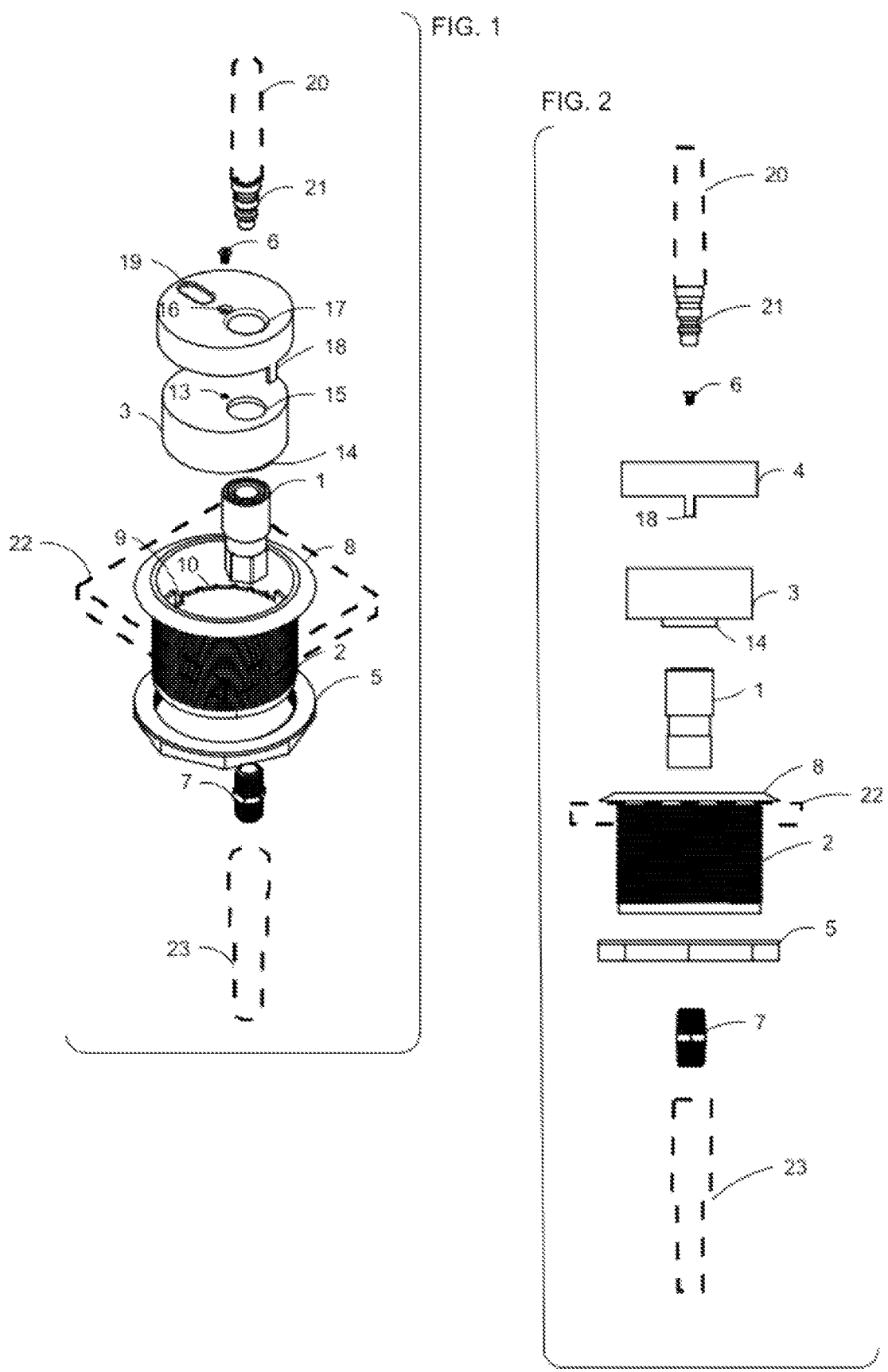

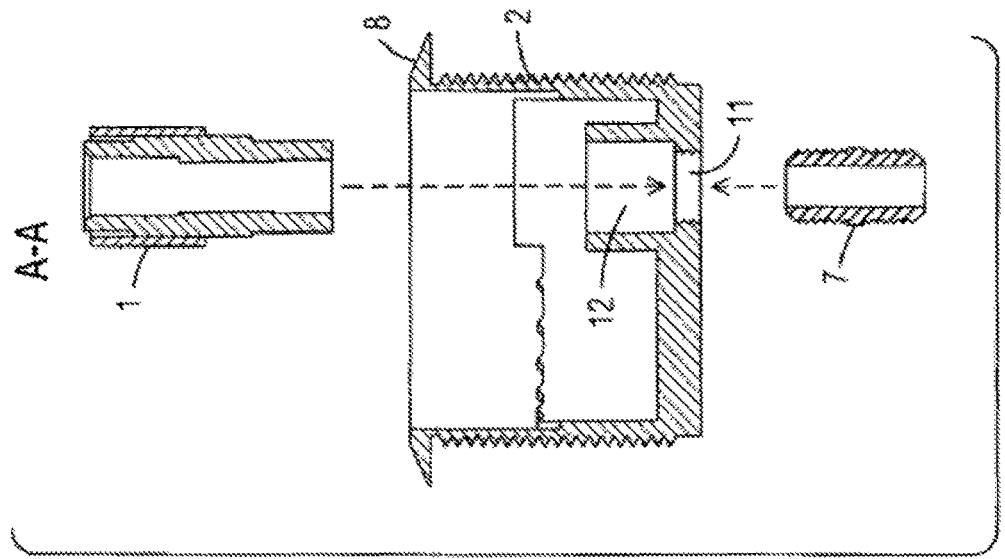
FIG. 7B
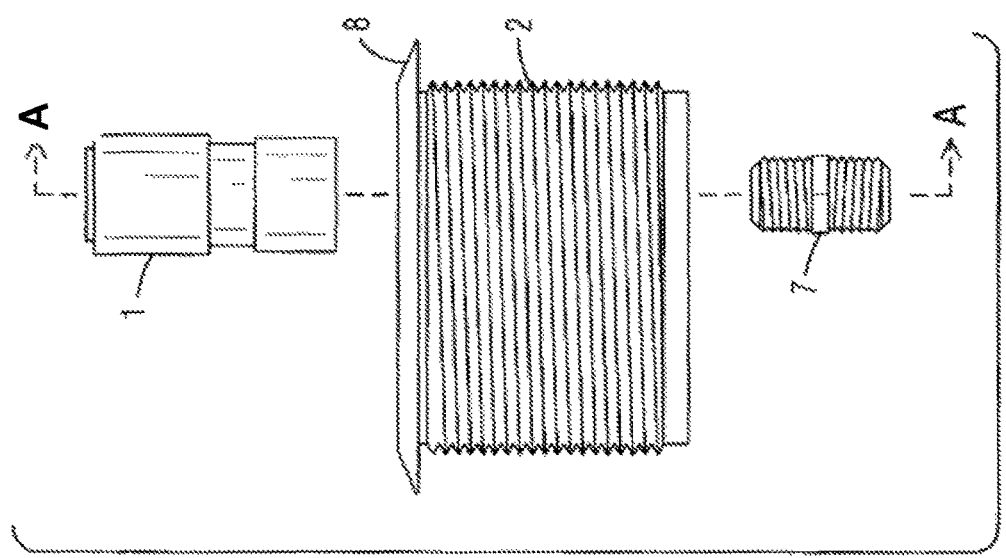
FIG. 7A
FIG. 7

AIR HOSE COUPLER HOUSING

CROSS REFERENCE TO RELATED APPLICATION

This application claims the benefit of priority to provisional patent application 63/130,860 filed Dec. 28, 2020.

BACKGROUND OF THE INVENTION

This invention relates to hose couplers, more particularly a housing for an air hose coupler.

Conventional air hose systems require excessive time accessing the hoses and require two hands to connect and disconnect couplers. In addition, hoses left on the ground while not in use pose as tripping hazards and restrict movement of people and equipment. As a result, such conventional compressed air hose systems are cumbersome to use both while routing of hoses and while connecting/disconnecting couplers.

The present invention aims to solve problems pertaining to air hose management by making connection points more accessible and reducing common tripping hazards in traditional air systems. This invention can be quickly operated with one hand.

SUMMARY OF THE INVENTION

The primary object of the present invention is to provide a hose coupling housing that makes air hose connections more accessible, quicker, easier and safer.

Another object of the present invention is to provide a hose coupling housing wherein supply hoses can be permanently routed out of the way of users and equipment.

The present invention fulfills the above and other objects by providing an air hose coupling housing assembly with a cylindrically-shaped outer component having a top, a planar bottom and a perimeter encompassing a hollow central portion, a beveled flange on a top of the perimeter and a circular access aperture in the bottom. A female air hose coupler protrudes from an inner surface of the bottom of the outer component. A hex nipple extends through the circular access aperture in the bottom and is threadably connected to the hose coupler.

The housing assembly also has an inner component sized and shaped to be inserted into the hollow central portion of the outer component and has an aperture through a top for exposing the top of the female hose coupler.

The air hose coupler housing assembly further includes a dust cover rotatably attached to the inner component, said dust cover having an access aperture for exposing the female hose coupler when said dust cover is rotated into alignment with the aperture in the top of the inner component. An indent in the top of the dust cover allows a user to insert a fingertip to aid in rotating the dust cover.

In order to be securely mounted in a cutout aperture in a planar surface, such as a table or bench, the outer surface of the perimeter of the outer component is threaded and an internally threaded retaining ring is provided to thread onto the bottom of the outer component under the planar surface until the housing assembly is tightened firmly in the aperture.

Other features of the air hose coupler housing assembly include a sleeve extending from the bottom of the aperture to secure the inner component to the quick connect coupler, two opposing tabs extending from a bottom of a perimeter of the dust cover and two ridged shelves on an inner perimeter wall of the outer component onto which the two opposing tabs on the dust cover rotate above when moving between open and closed positions and two slots on the inner perimeter wall of the outer component into which the tabs settle in an open position.

Methods of installation and use of the air hose coupler assembly are also disclosed herein.

The above and other objects, features and advantages of the present invention should become even more readily apparent to those skilled in the art upon a reading of the following detailed description in conjunction with the drawings wherein there is shown and described illustrative embodiments of the invention.

DESCRIPTION OF THE DRAWINGS

In the following detailed description, reference will be made to the attached drawings in which:

FIG. 1 is an exploded side view of the air hose coupler housing of the present invention illustrating the components of the housing;

FIG. 2 is an exploded side perspective view of the air hose coupler housing of the present invention illustrating the components of the housing;

FIG. 7 is a sectional view of the outer components and hardware secured to it in order of assembly.

DESCRIPTION OF THE PREFERRED EMBODIMENTS

Figure 3:
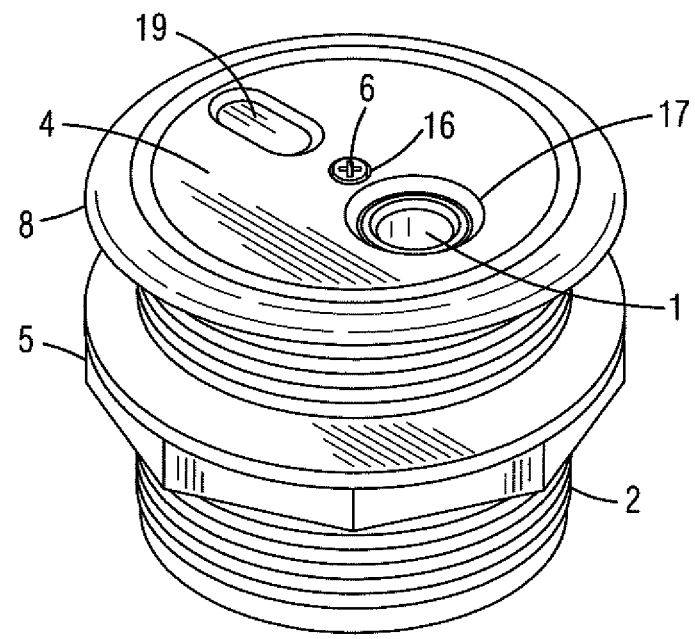
FIG. 3 is a side top perspective view of the assembled air hose coupler housing of the present invention.
Figure 4:
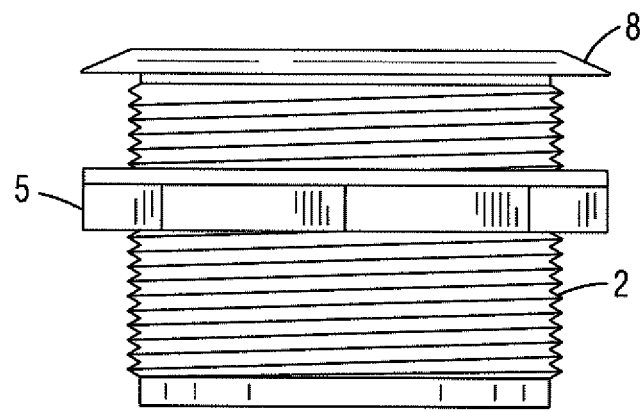
FIG. 4 is a side view of the assembled air hose coupler housing of the present invention.
Figure 5:
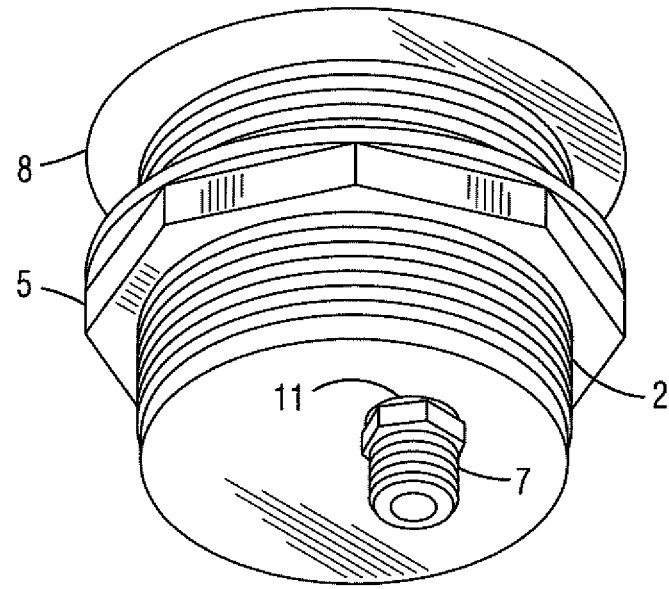
FIG. 5 is a side bottom perspective view of the assembled air hose coupler housing of the present invention.
Figure 6:
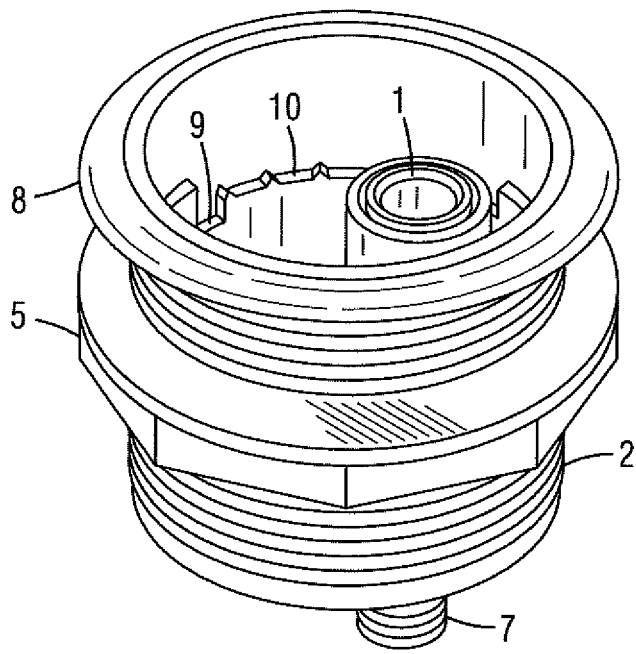
FIG. 6 is a side top perspective view of the air hose coupler housing of the present invention illustrating the inner components.

For purposes of describing the preferred embodiments, the terminology used in reference to the numbered components in the drawings is as follows:

1. Female Air Hose Coupler
2. Outer Component
3. Inner Component
4. Dust Cover
5. Retainer
6. Screw
7. Hex Nipple
8. Beveled flange
9. Slots
10. Ridged shelves
11. Circular access aperture
12. Hexagonal off-center coupler sleeve
13. Screw aperture
14. Off-center sleeve
15. Aperture in inner component
16. Countersunk Aperture
17. Off-center aperture
18. Opposing tabs
19. Grip indent Referring to the drawing figures, FIGS. 1 through 7 illustrate in many views the air hose coupler housing assembly of the present invention. The components of the assembly include a female air hose coupler 1 having a hexagonal shaft is encased by a hexagonal off-center coupler sleeve 12, as shown in FIG. 7. The coupler sleeve 12 protrudes from the bottom inner surface of the outer component 2. The outer component 2 is cylindrical with an open top. The outer component 2 can be modified to fit the dimensions of the specified female coupler 1.

The outer wall of the outer component 2 is threaded to accept an internally threaded retainer 5. The inner wall of the outer component 2 has two slots 9 with two ridged shelves 10 which the dust cover 4 with tabs 18 uses for alignment and positional locking. The upper edge of the outer component 2 has a beveled flange 8 about its perimeter which protrudes beyond the outer thread diameter of the outer component 2. Its purpose is to act as an upper stop when the outer component 2 is mounted through a compatible aperture in a mounting surface, such as a table or other planar surface.

An inner component 3 fits loosely inside a dust cover 4 and has an open bottom. The inner component has a preferably off-center sleeve 14 which protrudes downward from the top and friction mounts to the collar of the female coupler 1. The inner component 3 has an aperture 15 centered over the female air hose coupler 1 and has the same diameter as the inner diameter as the collar of the female air hose coupler 1. The spring action of the collar of the female air hose coupler 1 holds the inner component 3 in a fully upright position. When the inner component 3 is manually depressed, the aperture 15 slips over the inner tube of the female air hose coupler 1, depressing the collar and opening the coupler 1 to receive an outgoing male air hose fitting. The inner component 3 has a screw aperture 13 in the center of its top surface which allows the dust cover 4 to mount to it.

Like the inner and outer components, the dust cover 4 is preferably cylindrical with an open bottom and has two opposing tabs 18 on its outer bottom rim. The dust cover 4 nests over top of the inner component 3 and is fastened to the inner component 3 with a screw 6 in the center, which allows it to swivel 90 degrees over the inner component 3. The two opposing tabs 18 rotate above the ridged shelves 10 when moving between open and closed positions and settle into the slots 9 on the outer component 2 in the open position. The dust cover 4 has an off-center aperture 17 of the same diameter as the aperture 15 in the inner component 3 and is aligned with the aperture 15 when in the open position. The dust cover 4 also has an oblong indentation to allow for digital swiveling of the dust cover 4.

As is best illustrated in the side cross-sectional view of FIG. 7 the outer component 2 has a circular access aperture 11 through the bottom which has a diameter smaller than the hexagonal base of the coupler 1. The circular access aperture 11 prevents the coupler from moving downward. The hex of the hex nipple 7 seats against the bottom of the circular access aperture 11 and prevents the coupler 1 from moving upward.

To install the air hose coupler housing of the present invention on a mounting surface knot part of the invention), one must prepare the mounting surface by creating an aperture slightly larger than the outer threaded diameter of the outer component 2. Then the outer component 2 is inserted in the aperture until the beveled flange 8 is in contact with the mounting surface. The threaded retainer ring 5 is rotated onto the bottom of the outer component 2 until the retainer ring 5 makes contact with the underside of the mounting surface and tightened until secure. Thus, once verified as securely and firmly in place an air supply hose (not part of the invention) can be connected to the hex nipple 7, applying sealant tape on the threads as necessary.

Once installed as set forth above, the first step in proceeding to use the device is to unlock the housing so an air supply hose can be attached. To unlock the housing, a user must use his or her fingers to manually rotate the top surface of the dust cover 4 into the open position by rotating the grip indentation 19 counterclockwise, revealing access to the female air hose coupler 1.

Then, an outgoing air hose which matches the specific size of the female air hose coupler 1 may be attached. To attach the outgoing air hose, the user should open the dust cover 4 and fully depress the top surface of the dust cover 4 until it stops moving and hold it in that position. The user can then insert the male fitting of the outgoing air hose knot part of the invention) and insert it into the off-center aperture 17 on the dust cover 4. After firmly holding the outgoing air hose fitting into the female air hose coupler 1, the user can release the dust cover 4 to its fully upright position, and the attachment is complete. Once ensured that all connections are secure a user can proceed to use the outgoing air hose as desired.

To remove an outgoing air hose that is currently connected to the housing, one must firmly press the outgoing air hose down, and depress the top surface of the dust cover 4 until the outgoing air hose is loose. Then the outgoing air hose can be pulled away at which time some air blowback may be experienced from the air coupler being disconnected as is typical when disconnecting a quick-connect coupler. The removal process is now complete.

When not in use, the housing should remain in a locked position. To return the invention to the locked position after use, a user should use his or her fingers to manually rotate the dust cover 4 by rotating the grip indentation 19 clockwise, thus closing access to the female air hose coupler 1. The locking process is now complete.

The air hose coupler housing of the present invention can be manufactured using any combination of hard, durable materials, including without limitation, metals and polymers. The chosen material must be sufficiently durable to resist wear and tear from repeated use over long periods of time. The housing should also be coverable of withstanding forces from daily use and interaction with the environment. The components could be manufactured using 3d printing, injection molding, milling, machining, and/or any other applicable manufacturing process which results in parts that maintain their structural integrity, function, aesthetic, and wear resistance. Once manufactured, components will need to be assembled and require purchased hardware for completion.

It is to be understood that while preferred embodiments of the invention have been described, it is not to be limited to the specific form or arrangement of parts herein described and shown. It will be apparent to those skilled in the art that various changes may be made without departing from the scope of the invention and the invention is not to be considered limited to what is shown and described in the specification and/or drawings.

Having thus described my invention, I claim:

1. An air hose coupling housing comprising:
   an outer component having a top, a planar bottom and a perimeter encompassing a hollow central portion, a beveled flange on a top of the perimeter and a circular access aperture in the bottom;
   a female air hose coupler protruding from an inner surface of the bottom of the outer component;
   a hex nipple extending through the circular access aperture in the bottom and threadably connected to the hose coupler;

an inner component sized and shaped to be inserted into the hollow central portion of the outer component and having an aperture through the top for exposing the top of the female hose coupler; and a dust cover rotatably attached to the inner component, said dust cover having an access aperture for exposing the female hose coupler when said dust cover is rotated into alignment with the aperture in the top of the inner component.

2. The air hose coupler housing of claim 1 further comprising:

an indentation in the top of the dust cover to enable a user to insert a fingertip to aid in rotating the dust cover.

3. The air hose coupler housing of claim 1 wherein an outer surface of the perimeter of the outer component is threaded.

4. The air hose coupler housing of claim 3 further comprising:

an internally threaded retaining ring for securing the housing within an aperture in a planar surface by threading said ring onto the bottom of the outer component until tightened in the aperture.

5. The air hose coupler housing of claim 1 further comprising a sleeve extending from a bottom of the aperture of the inner component to secure the inner component to the female hose coupler.

6. The air hose coupler housing of claim 1 further comprising: two opposing tabs extending from a bottom of a perimeter of the dust cover.

7. The air hose coupler housing of claim 6 further comprising:

two ridged shelves on an inner perimeter wall of the outer component onto which the two opposing tabs on the dust cover rotate above when moving between open and closed positions and two slots on the inner perimeter wall of the outer component into which the tabs settle in an open position.

8. A method of installing an air hose coupler housing of claim 3 on a mounting surface comprising the steps of:

preparing the mounting surface by creating an aperture larger than an outer threaded diameter of the outer component;

inserting the outer component into the aperture until the beveled flange is in contact with the mounting surface;

rotating an internally threaded retainer onto the bottom of the outer component until the retainer makes contact with the underside of the mounting surface and tightening until secure; and connecting an air supply hose to the hex nipple and applying sealant tape.

9. A method of using an air hose coupler housing of claim 2 comprising the steps of:

Unlocking the housing so an air supply hose can be attached by manually rotating the top surface of the dust cover into an open position by rotating the indentation revealing access to the female air hose coupler; and attaching an outgoing air hose which matches the specific size of the female air hose coupler by opening the dust cover and fully depressing the top surface of the dust cover until it stops moving and holding it in that position and then inserting a male fitting of the outgoing air hose into the off-center aperture on the dust cover.

10. The method of claim 9 further comprising a step of removing the outgoing air hose; depressing the outgoing air hose; depressing the top surface of the dust cover until the outgoing air hose is loose; and pulling away the outgoing air hose.

11. The method of claim 10 further comprising a step of putting the housing in a locked position: a user placing his or her fingers in the indentation on the dust cover to manually rotate the dust cover, thus closing access to the female air hose coupler.

* * * * *